United States Patent

Chashi et al.

[15] 3,636,378

[45] Jan. 18, 1972

[54] SERIES-SHUNT-TYPE SEMICONDUCTOR SWITCHING CIRCUIT

[72] Inventors: Shin-Ichi Chashi, Kodaira-shi; Hiroshi Nomoto, Hachioji-shi, both of Japan

[73] Assignee: Hitachi Ltd., Tokyo, Japan

[22] Filed: Aug. 7, 1969

[21] Appl. No.: 848,262

[30] Foreign Application Priority Data

Aug. 9, 1968 Japan....................................43/56150

[52] U.S. Cl................................................307/251, 307/304

[51] Int. Cl.........................................................H03k 17/60

[58] Field of Search..................307/205, 251, 255, 279, 304, 307/313

[56] References Cited

UNITED STATES PATENTS

| | | | |
|---|---|---|---|
| 3,069,567 | 12/1962 | Lewis | 307/255 |
| 3,378,779 | 4/1968 | Priddy | 307/251 X |
| 3,386,053 | 5/1968 | Priddy | 307/255 X |
| 3,395,290 | 7/1968 | Farina et al. | 307/205 X |
| 3,406,346 | 10/1968 | Wanlass | 307/304 X |
| 3,408,511 | 10/1968 | Bergersen et al. | 307/304 X |
| 3,448,293 | 6/1969 | Russell | 307/251 |
| 3,513,365 | 5/1970 | Levi | 307/251 X |

OTHER PUBLICATIONS

Rogers, Reduction of Impulse Noise by Interruption of Signal Flow Using a Field Effect Transistor, RCA TN, No. 640, August 1965.

*Primary Examiner*—Stanley T. Krawczewicz
*Attorney*—Craig, Antonelli & Hill

[57] ABSTRACT

A series-shunt-type semiconductor switching circuit in which at least one impedance element is provided in an electrical path consisting of a connection point of a capacitance element across the input terminals and the signal applied to one of the input terminals of the switching circuit, two switching elements connected in a series-shunt fashion and excited alternately to ON and OFF states and a common terminal. By this construction spike noise and offset voltages heretofore encountered with the conventional switching device can be removed.

9 Claims, 11 Drawing Figures

INVENTORS

SHIN-ICHI OHASHI and HIROSHI NOMOTO

BY Craig, Antonelli, Stewart & Hill

ATTORNEYS

INVENTORS

SHIN-ICHI OHASHI and HIROSHI NOMOTO

BY
Craig, Antonelli, Stewart & Hill
ATTORNEYS

INVENTORS

SHIN-ICHI OHASHI and HIROSHI NOMOTO

BY Craig, Antonelli, Stewart & Hill

ATTORNEYS

SERIES-SHUNT-TYPE SEMICONDUCTOR SWITCHING CIRCUIT

BACKGROUND OF THE INVENTION

1. Field of the Invention

The present invention relates to semiconductor switching circuits of a series-shunt-type using field-effect transistors, and more particularly it pertains to those which are so designed that offset voltages due to spike noise can be greatly reduced.

2. Description of the Prior Art

Generally, in a semiconductor switching circuit, when field-effect transistors are used as switching elements, these transistors are switched from a nonconductive (OFF) state to a conductive (ON) state and vice versa with excitation voltages of a square waveform. Since, however, these transistors themselves have individual interelectrode capacitances between their electrodes, change of operating states of the transistors are inevitably accompanied with the so-called spike noise stemming from the interelectrode capacitances which serve to differentiate square wave voltages applied to the transistors.

For this reason, heretofore there have been experienced difficulties to be obviated such that widening of the frequency band of a switching device is impossible due to restricted upper limit of an excitation frequency for the switching elements, offset voltages are caused, and the caused offset voltages are further fluctuated by changes of the ambient temperature to bring about drift.

SUMMARY OF THE INVENTION

The primary object of the present invention is, therefore, to provide a series-shunt-type semiconductor switching circuit free from any offset voltage due to spike noise.

Another object of the present invention is to provide a series-shunt-type semiconductor switching circuit eliminating any offset voltage appearing on the input side of the circuit.

In order to achieve the above-mentioned and other objects, the construction in accordance with the present invention has at least one impedance element in a circuit path in a semiconductor switching circuit using two field-effect transistors connected in a series-shunt fashion, so that the impedance element controls a spike current to eliminate offset.

BRIEF DESCRIPTION OF THE DRAWINGS

FIGS. *1a* and *1b* are illustrations of spike noise.

DESCRIPTION OF THE PREFERRED EMBODIMENTS

Reference will first be made to FIGS. *1a* and *1b* to explain the spike noise.

As described above, in a semiconductor switching circuit, when field-effect transistors are used as switching elements, they are switched from OFF (or ON) to ON (or OFF) state with an excitation voltage of a square waveform such as indicated in FIG. *1a*, and upon this switching the square wave voltage is differentiated due to the interelectrode capacitances of the transistors, thus causing spike noises as indicated at A and B in FIG. *1b*. These spike noises A and B are generated at every instant when the transistors are switched from ON to OFF state or from OFF to ON state depending on the OFF resistance and ON resistance of the switching elements. Therefore, the area of a negative spike is different from that of a positive spike.

Figure 2:
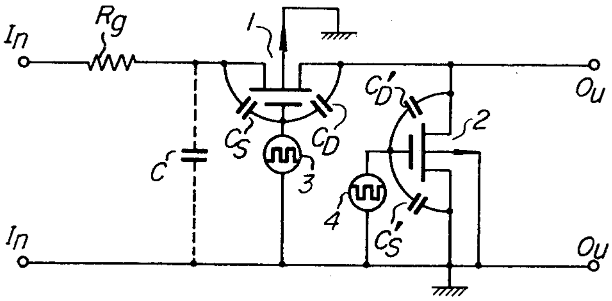
FIG. 2 is a schematic circuit diagram of a conventional semiconductor switching circuit in which switching elements are connected in a series-shunt fashion.

Accordingly, such spike noise also takes place in a series-shunt-type chopper as shown in FIG. 2 constituted by MOS-type field-effect transistors (hereafter referred to as MOS transistor), kinds of insulated gate field-effect transistors, used as switching elements. In FIG. 2, MOS transistors 1 and 2 connected in a series-shunt fashion are alternately switched to ON and OFF states by means of opposite phase square wave voltages from exciting sources 3 and 4, so that a DC input signal applied to input terminals $I_n$ is modulated and converted into an AC output signal. When appearing at output terminals $O_u$ the converted AC signal is accompanied with spike noise due to the presence of interelectrode capacitances $C_D$ and $C_S$ of the MOS transistor 1 and $C'_D$ and $C'_S$ of the MOS transistor 2. $R_g$ represents a signal source impedance.

Among the interelectrode capacitances of the MOS transistors, the interelectrode $C'_S$ is negligible as the spike current flowing through the interelectrode capacitance $C'_S$ is conducted neither to the input electrode $I_n$ nor to the output electrode $O_u$ because the spike current is short circuited by a closed loop consisting of the interelectrode capacitance $C'_S$ and the exciting source 4, while the effects of the interelectrode capacitances $C_D$ and $C'_D$ are cancelled out by each other and therefore are negligible if the characteristics of the used MOS transistors 1 and 2 are identical with each other as spike currents flowing through the interelectrode capacitances $C_D$ and $C'_D$ are then of equal amplitude and of opposite polarities. As a result, care has to be devoted only to spike current flowing through the interelectrode $C_S$.

Spike current from the exciting source 3 flowing through the interelectrode capacitance $C_S$ is conducted to both the input terminal $I_n$ and the output terminal $O_u$. Now, if a capacitor C is connected across the MOS transistor 1 on the input side thereof as indicated by dotted lines in FIG. 2 for the purpose of eliminating spike current flowed in the input terminal $I_n$ side, the signal source impedance $R_g$ and the source electrode of the MOS transistor 1 are equivalently considered to be grounded with respect to an impulse such as the spike current. Thus, spike current conducted to the input terminal side in the ON state and that in the OFF state are equal in magnitude to each other, which would cause the DC voltage produced across the capacitor C to be zero. This is for the following reason: The impedance viewed rightwardly from the source electrode of the MOS transistor 1 is always high since either one of the MOS transistors 1 and 2 is in the OFF state, while the impedance exhibited by the capacitor C becomes low with respect to a high-speed signal such as a spike current. Therefore, spike current does not flow into the source electrode of the MOS transistor 1 but is always made to flow into the capacitor C. The spike current does not include any DC component that may flow through the interelectrode capacitance $C_S$. Consequently, the value of the spike current induced at the change of the operating state of the MOS transistor from ON to OFF state and vice versa is zero on the average, i.e., spike current induced when the transistor becomes ON and that when the transistor becomes OFF (the mean values of two succeeding half cycles of spike current) are equal in amount with and opposite in polarity to each other.

Actually, however, notwithstanding the provision of the capacitor C to short circuit the spike current, an offset voltage still appears across the capacitor.

As a result of the inventors' investigation of the cause of such offset voltage, it has been found that such offset voltage is inevitably generated due to the existence of the rectifying function of PN junctions formed by the substrate and the drain and source which constitute an MOS transistor. To describe this fact, suppose that the excitation voltage to be applied to a P-channel MOS transistor changes in a positive-going direction, a portion of spike current flowing through the interelectrode capacitance $C_S$ passes both through the PN-junctions between the drain and the substrate and through the PN-junction between the source and the substrate in individual forward direction. Meanwhile, when the excitation voltage changes in a negative-going direction, then a current flows through the PN-junctions in individual backward direction. In this way, the amount of spike current is changed depending on the current flowing through the PN-junctions such that the amount of spike current becomes relatively small when a portion of the spike current flows through the PN-junctions in the forward direction and becomes relatively large when a portion of the spike current flows through the PN-junctions in the backward direction. This causes a DC component across the capacitor in the reverse direction.

For this reason, in a P-channel MOS transistor, spike current caused when an excitation voltage changes in a positive-going direction to make the transistor nonconductive is different from that when the excitation voltage changes in a negative-going direction to make the transistor conductive, which results in a direct current flow in average through the capacitor and produces a DC voltage of negative polarity across the capacitor. In an N-channel MOS transistor, the polarity of the excitation voltage for rendering the transistors conductive or nonconductive is opposite to the case of a P-channel transistor, so that a DC voltage of opposite, i.e., positive, polarity will be produced. This is true of any P-channel and N-channel MOS transistor and junction-type field-effect transistor.

As mentioned above, when use is made of a field-effect transistor in a conventional series-shunt-type semiconductor switching device, a DC voltage is generated on the signal input side of the switching circuit and constitutes an offset voltage of the switching circuit.

The present invention is to eliminate such an offset voltage and will be described on the principle of operation, function and effect, referring to the drawings.

Figure 1A:
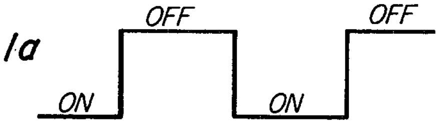
Figure 1B:
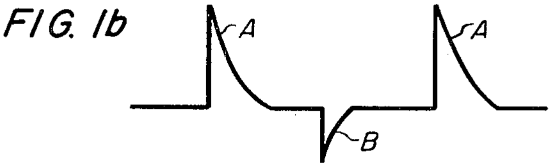
Figure 3:
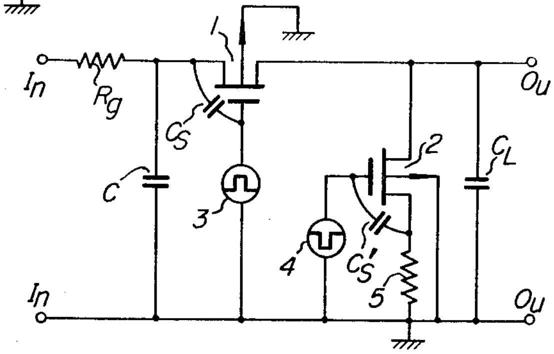
FIG. 3 is a schematic circuit diagram showing a switching circuit in accordance with an embodiment of the present invention.

FIG. 3 is a schematic circuit diagram showing an example of the constitution in accordance with the present invention, in which reference numeral 5 denotes a resistance element connected between the source electrode of the MOS transistor 2 and the ground, reference character $C_L$ denotes an equivalent combined capacitance representative of the interelectrode capacitance between the drain and source electrodes of the MOS transistor 2, a load connected across the output terminals $O_u$ and the input capacitance of an amplifier in the succeeding stage. In FIG. 3, like parts are denoted by same reference numerals and characters as in FIG. 1.

In this constitution, a portion of spike current flowing through the interelectrode capacitance $C'_S$ which would be negligible without the resistance element 5 is charged in the combined capacitance $C_L$ by way of the MOS transistor 2 when the latter is turned from ON to OFF. Subsequently, the current charged in the capacitance $C_L$ flows into the capacitor C by way of the MOS transistor 1 which is ON state, thereby making the terminal voltage of negative polarity across the capacitor C more positive to be zero finally. Thus, the voltage across the capacitor C can be compensated. Therefore, by properly setting the value for the resistance element 5, elimination of an offset voltage can be attained. Although a portion of spike current flowing through the interelectrode capacitance $C'_S$ flows into the combined capacitance $C_L$ also when the MOS transistor 2 is turned from OFF to ON, the current flowing into the capacitance $C_L$ is subsequently discharged through the conductive MOS transistor 2 without flowing into the capacitor C.

Figure 4:
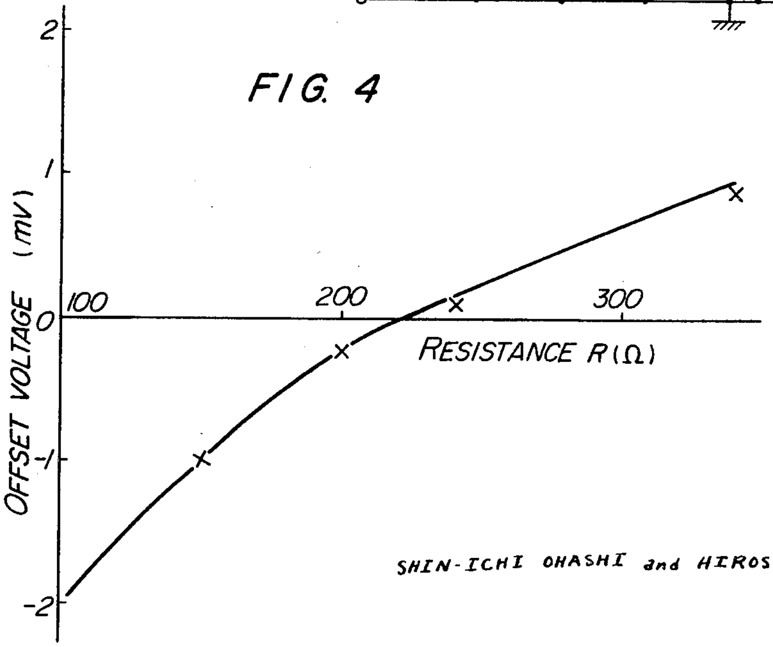
FIG. 4 is a graphic illustration of a change of an offset voltage of the circuit shown in FIG. 3.

FIG. 4 represents a characteristic curve of offset voltage $V_c$ with respect to resistance R of the resistance element 5 in the series-shunt-type semiconductor switching circuit shown in FIG. 3. The ordinate and abscissa indicate the offset voltage $V_c$ in millivolts and the resistance R of the resistance element 5 in ohms respectively. As the exciting sources square wave voltages of opposite polarities at 2 MHz. having an amplitude of 8 volts were used. As can be seen from this characteristic curve, a resistance of 220 ohms for the resistance element 5 provided an optimum compensation to make the offset voltage zero.

Figure 5:
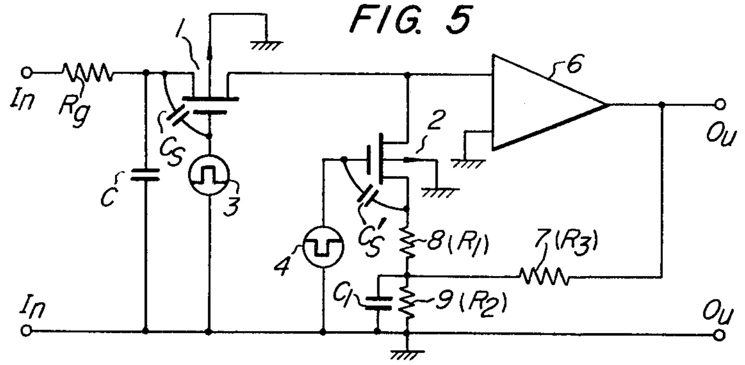
FIGS. 5–8 are schematic circuit diagrams showing switching circuits in accordance with other embodiments of the present invention.

FIG. 5 shows a negative feedback amplifier using a series-shunt-type semiconductor switching circuit in accordance with the present invention. In this figure, like parts are denoted by same reference numerals and characters as in FIG. 2. There is provided a circuit 6 for amplifying and demodulating the output of the switching circuit. A portion of the output of the amplifying and demodulating circuit is negatively fed back to the connection point between resistors 8 and 9 by way of a resistor 7. In this negative feedback amplifier, the combined resistance $R'_1$ viewed from the source electrode of the MOS transistor 2 is represented by $$R'_1 = R_1 + \frac{R_2 \cdot R_3}{R_2 + R_3} \qquad (1)$$

where the output resistance of the amplifying and demodulating circuit 6 is neglected and $R_1$, $R_2$ and $R_3$ denote resistances for resistors 8, 9 and 7 respectively. Therefore, by adjusting the combined resistance $R'_1$ to 220 ohms, an optimum compensation can be obtained and the offset voltage will become zero. Meanwhile, as is well known, the gain of the negative feedback amplifier when sufficiently high, is represented by $$G \simeq \frac{R_2 + R_3}{R_3} \qquad (2)$$

If the optimum compensation in terms of equation (1) does not comply with equation (2), an additional capacitor $C_1$ may be connected in parallel with the resistor 9, thereby adjusting the resistance $R_1$ for an optimum compensation.

As a result of the provision of the capacitor $C_1$, a DC voltage may be generated also across the capacitor $C_1$ due to spike current flowing through the interelectrode capacitance $C'_S$ of the MOS transistor 2, thus causing an offset.

In the present invention, even such an offset can be eliminated.

Figures 6, 7:
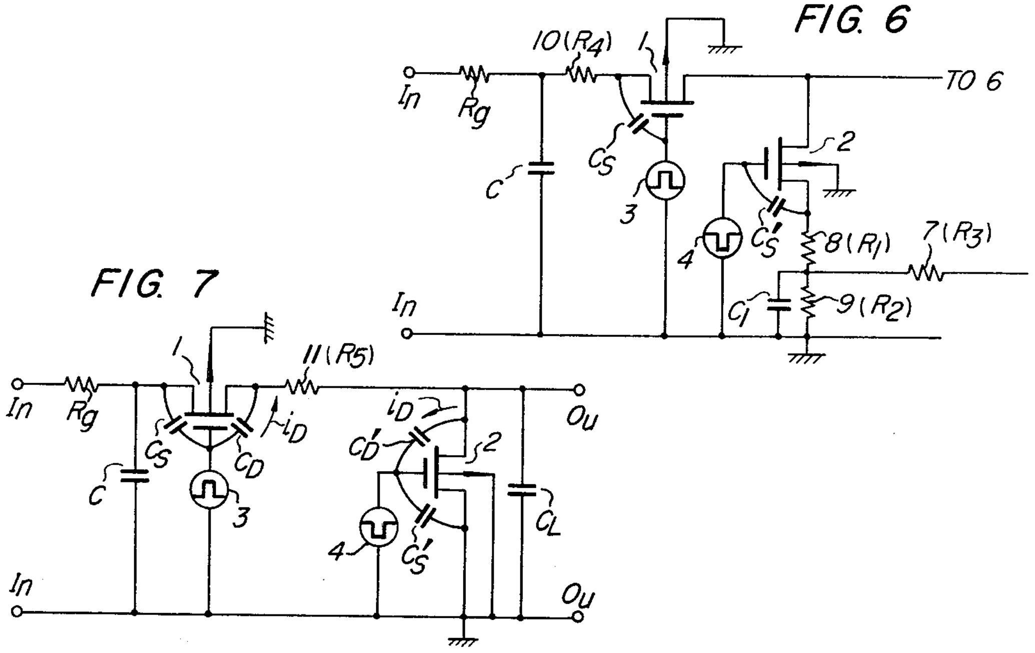

FIG. 6 is a schematic circuit diagram of a switching device free from such offset in accordance with an embodiment of the present invention, in which like parts are denoted by same reference numerals and characters as in FIG. 5, and there is provided a resistor 10 between the source electrode of the MOS transistor 1 and the capacitor C. By adjusting the resistance $R_4$ of the resistor 10, it is possible to compensate for the offset at the capacitor $C_1$ symmetrically with the compensation of the DC voltage at the capacitor C.

It is also possible to dispense with either the resistor 8 or the resistor 10 depending on the values of the offset voltages at the capacitors C and $C_1$ in order to approximately minimize the offset of the switching device.

FIG. 7 is a schematic circuit diagram of a switching device in accordance with another embodiment of the present invention, in which the offset encountered with the conventional device is eliminated by a resistance element 11 connected between the drain electrodes of the MOS transistors 1 and 2. Reference character $C_L$ denotes a similar combined capacitance as mentioned above. With this constitution, when the resistance $R_5$ of the resistance element 11 is zero, a negative DC voltage appears at the capacitor C as mentioned above. And, with an increase of the resistance $R_5$, spike current $i_D$ flowing through the interelectrode $C_D$ upon change of the MOS transistor 1 from ON to OFF is shunted by the resistance element 11, and a portion of the shunted current passes to the capacitor C through the MOS transistor 1 which is conductive at the beginning of the change. Apparently, the amount of the shunted current can be controlled by changing the resistance $R_5$ of the resistance element 11, so that the terminal voltage of the capacitor C which was negative can be rendered more positive. Therefore, in the course of changing the resistance $R_5$, it is possible to perform an optimum compensation by setting the resistance to the effect that the offset voltage becomes zero. In this connection, although spike current $i'_D$ flowing through the interelectrode $C'_D$ when the MOS transistor 2 is switched from OFF to ON is different in amount from the spike current $i_D$ because of the fact that the latter $i_D$ is shunted and accordingly a DC voltage is generated across the combined capacitor $C_L$ due to the unbalance between $i_D$ and $i'_D$, such DC voltage will become zero since the combined capacitor $C_L$ is discharged through the MOS transistor 2 which is conductive.

Meanwhile, when the MOS transistor 1 is switched from OFF to ON and the MOS transistor 2 from ON to OFF, spike current flowing (inversely to the indicated spike current $i_D$) through the interelectrode capacitance $C_D$ of the MOS transistor 1 can not flow in the MOS transistor 1 at the beginning of the change as the latter is nonconductive but flows through the resistance element 11 and is neutralized by spike current flowing (inversely to the indicated spike current $i'_D$) through the interelectrode capacitance $C'_D$. Namely, by the above-mentioned change of the transistors, the combined capacitance $C_L$ is not charged by the spike current, and therefore, the equivalent resistance of the resistance element 11 is zero, thus there is no appreciable effect on the terminal voltage of the capacitor C by the interelectrode capacitances $C_D$ and $C'_D$.

Even if, however, the interelectrode capacitances $C_D$ and $C'_D$ are considerably different from each other due to disunity of the characteristics of the MOS transistors 1 and 2, an optimum compensation for the offset voltage can be attained in accordance with the present invention.

Figure 8:
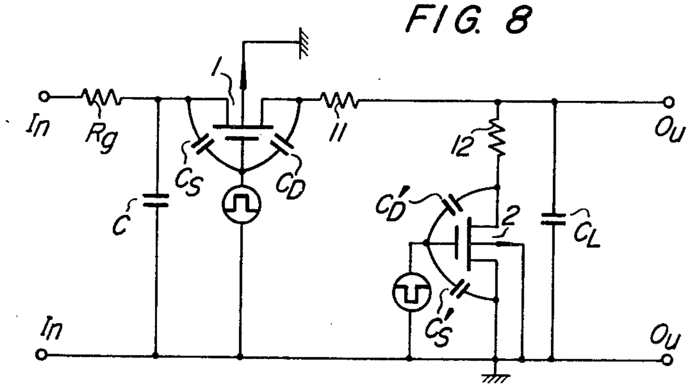

Referring to FIG. 8 which is a schematic circuit diagram of a switching circuit free from offset stemming from a difference between interelectrode capacitances $C_D$ and $C'_D$ due to the disunity of the transistors in accordance with an embodiment of the present invention. In FIG. 8, like parts are denoted by same reference numerals and characters as in FIG. 7, and an additional resistance element 12 is connected with the drain electrode of the MOS transistor 2. By this circuit arrangement, the amount of spike current flowing through the interelectrode capacitance $C_D$ and that flowing through the interelectrode capacitance $C'_D$ can be controlled by changing the resistances for the resistance elements 11 and 12. As a result, eliminate of the offset voltage generated across the capacitor C can be attained as in the case of FIG. 7. Clearly, it is possible to substitute a slidable resistor for the resistance elements 11 and 12 so that the upper output terminal $O_u$ connects to the sliding contact of the slidable resistor.

Figure 9:
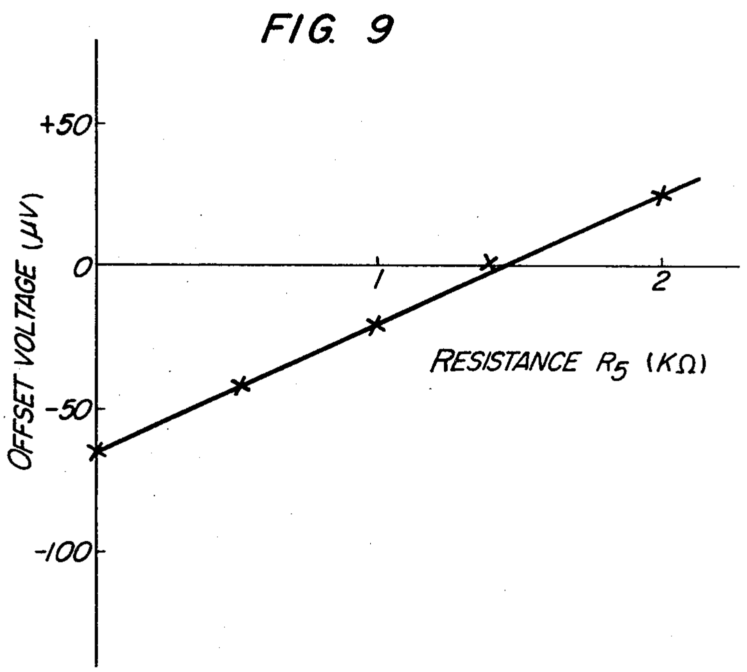
FIGS. 9 and 10 are graphic illustrations of changes of offset voltages of the circuits shown in FIGS. 7 and 8 respectively.

FIG. 9 represents a characteristic curve of offset voltage $V_c$ with respect to resistance $R_5$ of the resistance element 11 in the series-shunt-type semiconductor switching circuit shown in FIG. 7. The ordinate and abscissa indicate the offset voltage $V_c$ in microvolts and the $R_5$ of the resistance element 11 in kilohms respectively. As the exciting sources square wave voltages of opposite polarities at 1.5 kHz. having an amplitude of 8 volts were used. As can be seen from this characteristic curve, a resistance of 1.4 kilohms for the resistance element 11 provided an optimum compensation.

Figure 10:
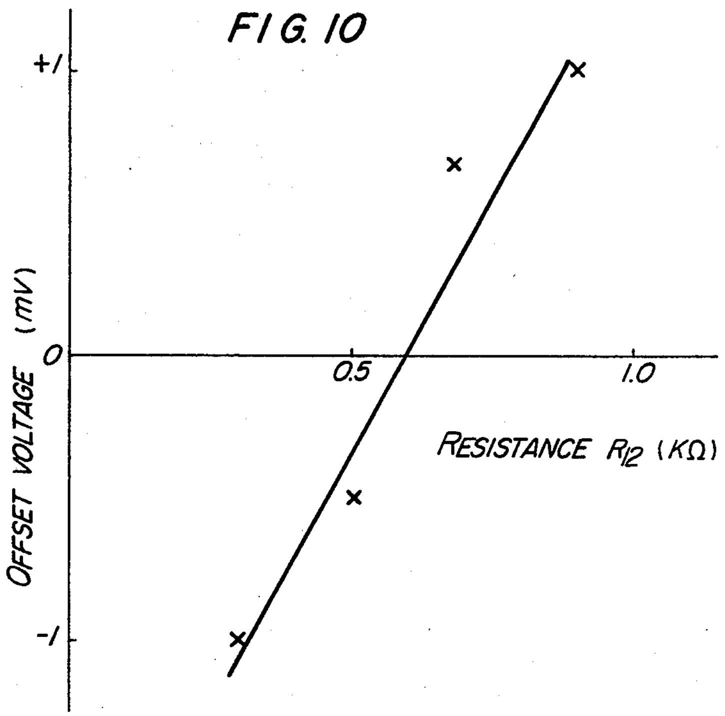

FIG. 10 represents a characteristic curve of offset voltage $V_c$ with respect to combined resistance $R_{12}$ of the resistance element 12 and 11 in the series-shunt-type semiconductor switching circuit shown in FIG. 8. The ordinate and abscissa indicate the offset voltage $V_c$ in millivolts and the combined resistance $R_{12}$ of the resistance element 12 and 11 in kilohms respectively. As the exciting sources were used square wave voltages of opposite polarities at 100 kHz. having an amplitude of 8 volts. As can be seen from this characteristic curve, a resistance of 0.6 kilohms for the combined resistance $R_{12}$ provided an optimum compensation to make the offset voltage zero.

In the forgoing description, though reference is made to eliminate of offset appearing in the input side of a series-shunt-type semiconductor switching circuit, the present invention is not limited thereto but is effective for elimination of offset voltage appearing on the output side due to a spike current flowed in the output side of an amplifier or synchronous detector in the succeeding stage next to the switching circuit. Namely, by suitably determining the resistances for the resistance elements for spike current control, a voltage greater or smaller than the offset voltage across the capacitor is produced depending on the positive or negative offset voltage appearing on the output side in order to overcompensate or short compensate, and thus any offset voltage appearing on the output signal is finally eliminate. Of course, if necessary, a capacitor may be added for compensation as indicated by $C_1$ in FIGS. 5 and 6.

As has been described, the present invention makes it possible to eliminate offset voltages and drift due to spike current and therefore provides a series-shunt-type semiconductor switching circuit which can be driven by exciting sources at a frequency of the order of several tens of GHz, which is particularly useful for a sampling circuit. Also, in the foregoing description, reference is made to P-channel MOS transistors, but the present invention is capable of making use of N-channel MOS transistors and other junction-type field-effect transistors. Further, similar effect of compensating the offset voltage can be obtained with such modifications that trapezoidal wave voltages are used for square wave ones and/or connection of the source and drain electrodes of MOS transistors is reversed.

We claim:

1. A series-shunt-type semiconductor switching circuit comprising:

two field-effect transistors connected in a series-shunt fashion between input and output terminals of the circuit and used as switching elements;

means, connected to said first and second field-effect transistors, respectively, for driving said first and second switching elements to alternately conductive and nonconductive states;

a capacitor one end of which is connected to the input terminal and the other end of which is connected to the ground; and at least one impedance element provided in an electrical path from a connection point of said capacitor and the input terminal, through said first and second switching elements to the ground, said impedance element operatingly eliminating offset voltage.

2. A series-shunt-type semiconductor switching circuit according to claim 1, wherein said at least one impedance element is a resistance element connected between the source electrode of the field-effect transistor constituting said second switching element.

3. A series-shunt-type semiconductor switching circuit according to claim 2, wherein said at least one impedance element includes a series connection of two resistors, to the junction of which another resistor is connected for negative feedback of the output of an amplifier thereto.

4. A series-shunt-type semiconductor switching circuit according to claim 3, wherein said at least one impedance element further includes a capacitance element connected between said junction of the two resistors and the common one of the output terminals.

5. A series-shunt-type semiconductor switching circuit according to claim 4, wherein said at least one impedance element further includes another resistance element connected between the source electrode of the field-effect transistor constituting said first switching element and the connection point of said capacitance and the signal applied one of the input terminals of the circuit.

6. A series-shunt-type semiconductor switching circuit according to claim 1, wherein said at least one impedance element is a resistance element connected to the drain electrode of the field-effect transistor constituting said first switching element.

7. A series-shunt-type semiconductor switching circuit according to claim 6, wherein said at least one impedance element further includes another resistance element connected to the drain electrode of the field-effect transistor constituting said second switching element.

8. A series-shunt-type semiconductor switching circuit according to claim 7, wherein said resistance elements are constituted by a slidable resistor the sliding contact of which is connected to the signal taking out one of the output terminals of the circuit.

9. A semiconductor switching circuit comprising:

first and second input terminals;

first and second output terminals, said second input terminal and said second output terminal being connected together;

means for controllably connecting said first input terminal with said first output terminal, including a first field-effect transistor connected between said first input and said first output terminal;

means for controllably connecting said first output terminal with said second output terminal, including a second field-effect transistor connected between said first and second output terminals;

means, connected to said first and second field-effect transistors respectively, for driving said first and second field-effect transistors into alternately conductive and nonconductive states;

a first capacitor connected between said first and second input terminals; and means for substantially eliminating offset voltage; comprising at least one impedance element provided in an electrical path from said first input terminal through said first and second field-effect transistors to said second output terminal.

* * * * *